United States Patent [19]

Madden

[11] 4,304,193
[45] Dec. 8, 1981

[54] REMOTE CONTROL APPARATUS FOR CONTROLLING ANIMALS

[76] Inventor: Lem A. Madden, 5530 Blue Lake Dr., Norman, Okla. 73069

[21] Appl. No.: 207,688

[22] Filed: Nov. 17, 1980

[51] Int. Cl.³ ............................................. A01K 15/00
[52] U.S. Cl. ........................................ 119/29; 54/71; 318/16
[58] Field of Search ....................... 119/29; 54/1, 71; 318/16

[56] References Cited

U.S. PATENT DOCUMENTS

| | | | |
|---|---|---|---|
| 453,846 | 6/1891 | McNair | 54/6 |
| 626,581 | 6/1899 | Whelan | 54/71 |
| 710,267 | 9/1902 | Graf | 54/71 |
| 2,023,950 | 12/1935 | Carter | 119/29 X |
| 2,800,104 | 7/1957 | Cameron et al. | 119/29 |
| 2,996,043 | 8/1961 | Pettingill | 119/131 |
| 3,161,005 | 12/1964 | Ackerson | 54/71 |
| 3,312,195 | 4/1967 | Rohena | 119/29 |
| 4,004,403 | 1/1977 | Henry | 54/71 |

Primary Examiner—Hugh R. Chamblee
Attorney, Agent, or Firm—E. Harrison Gilbert, III

[57] ABSTRACT

Electronic transmitter means are used for generating and emitting a control signal which is detected by an animal-handling mechanism associated with the animal for physically manipulating the animal to control its movement. The animal-handling mechanism includes motors for controlling the tensioning of reins connected to the head of the animal. A control signal can also be transmitted to activate a bat mechanism for striking the animal to urge it forward.

21 Claims, 8 Drawing Figures

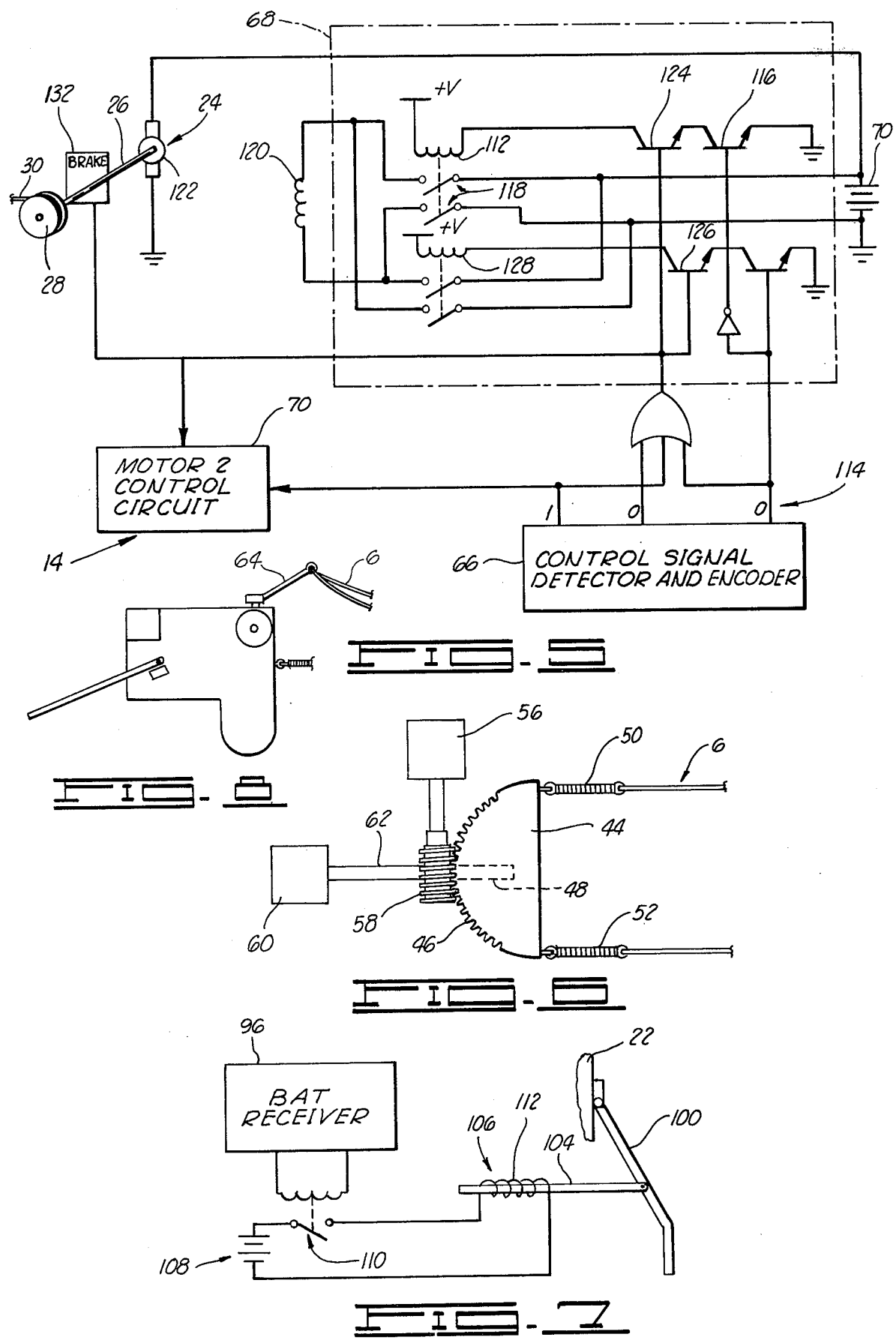

REMOTE CONTROL APPARATUS FOR CONTROLLING ANIMALS

BACKGROUND OF THE INVENTION

This invention relates generally to apparatus for controlling animals and more particularly, but not by way of limitation, to apparatus for remotely controlling the movement of a horse.

It is often difficult for individuals to directly handle animals or to train them. For example, an elderly person may be physically unable to mount and rein a horse by himself. However, it is often necessary for such an individual to be able to control the animal so that necessary chores, such as riding herd on cattle, can be performed. Although a rider, such as a jockey, can be hired to ride herd on cattle, or to gallop or otherwise work a horse, for example, it is time consuming and costly to search for and pay such a hired rider or jockey. Therefore, there is the need for an apparatus by which one person can remotely control the movement of an animal without having to physically mount and guide the animal.

In addition to those people who are unable to directly physically control an animal, there are those who desire to break or train animals, but who are unable to do so because of the hazards involved with such tasks. Therefore, there is also the need for a remote control apparatus which can be used to train an animal.

That there are such aforementioned needs is indicated by the disclosure in U.S. Pat. No. 710,267 to Graf which relates to an apparatus for training horses. The apparatus proposed in the Graf patent includes a frame carrying large and small winding rollers for use with training reins and bridle reins, respectively. In one example of the operation of the Graf apparatus, the arrangement is such that by exerting a traction upon a training rein, a bridle rein is attracted in a controlled manner. It is to be noted that the Graf apparatus maintains a mechanical connection between the trainer and the animal by means of the disclosed training reins.

The need for remotely controlling an animal is illustrated in the U.S. Pat. No. 2,800,014 to Cameron et al. This patent discloses a radio-controlled training device for use with animals. The proposed Cameron et al. training device provides a remotely controlled electrical shock to train the animal to which the electrical shock is applied. However, the Cameron et al. patent does not disclose an apparatus for remotely controlling reins connected to the animal for starting, stopping, and turning the animal.

SUMMARY OF THE INVENTION

The present invention overcomes the above-noted and other shortcomings of the prior art by providing a novel and improved apparatus for controlling the movement of an animal. This invention can be used to handle or train animals by remotely controlling the movement of reins attached to the animal. This handling or training of the animal with the present invention can be performed by a single individual who would otherwise be unable to physically control the animal or who would not desire to search for and pay a hired rider.

Broadly, the apparatus constructed in accordance with the present invention comprises electronic transmitter means for generating and transmitting a control signal. The apparatus also includes animal-handling means, responsive to the control signal, for physically manipulating the animal. The animal-handling means includes receiver means for receiving the control signal and directional adjustment means, responsive to the receiver means, for directing the movement of the animal.

The electronic transmitter means generally includes switch means and transmitter signal conditioning means. The switch means includes a switch housing, a switch element rotatably and slidably mounted in the switch housing, and switch contact means positioned in the switch housing for electrically engaging the switch element in predetermined relationships corresponding to predetermined rotational and sliding positions of the switch element to provide a respective electrical signal for each of the predetermined relationships. The transmitter signal conditioning means converts each electrical signal into a respective control signal having a characteristic corresponding to the respective electrical signal.

The directional adjustment means of the animal-handling means includes operating means for decoding the control signal received by the receiver means, first motor means, second motor means and interfacing means for coupling movement of either the first motor means or the second motor means to a head of the animal so that the head is moved to control the movement of the animal.

The apparatus of the present invention further includes means for striking the animal to urge the animal forward.

From the foregoing it is a general object of the present invention to provide a novel and improved apparatus for controlling the movement of an animal. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 5 is a schematic and block diagram of a portion of the motor operating means of the FIG. 1 embodiment.

FIG. 6 is a schematic illustration of a second preferred embodiment of a portion of the present invention.

FIG. 7 is a schematic illustration of the striking means portion of the present invention.

FIG. 8 is a schematic illustration of a third preferred embodiment of a portion of the present invention.

DETAILED DESCRIPTION OF PREFERRED EMBODIMENTS OF THE INVENTION

Figure 3:
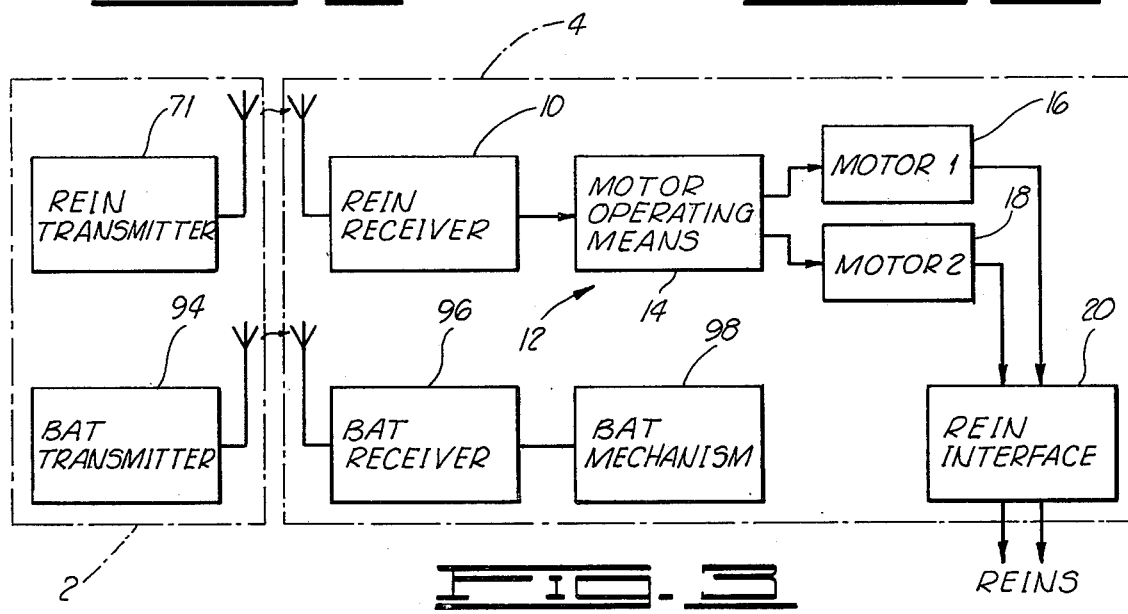
FIG. 3 is a block diagram of the preferred embodiment shown in FIG. 1.

With reference to the drawings, a preferred embodiment of an apparatus constructed in accordance with the present invention will be described. A block diagram of the preferred embodiment is illustrated in FIG. 3. The preferred embodiment includes electronic transmitter means 2 for generating and emitting a control signal which is particularly an electromagnetic wave having a predetermined format in the preferred embodiment. The apparatus further includes animal-handling means 4 which is responsive to the control signal for physically manipulating an animal. The preferred embodiment animal-handling means 4 illustrated in FIG. 1 particularly manipulates reins 6 which are connected to an animal 8, such as the illustrated horse.

FIG. 3 indicates that the animal-handling means 4 includes rein receiver means 10 for receiving the control signal having one of a plurality of predetermined formats to designate the position of the reins 6. The animal-handling means 4 further includes directional adjustment means 12 for directing the movement of the animal. The directional adjustment means 12 includes motor operating means 14 for decoding the control signal received by the receiver means 10. The directional adjustment means 12 also includes first motor means 16, second motor means 18, and rein interfacing means 20 for coupling movement of either the first motor means 16 or the second motor means 18 to the head of the animal so that the head is thereby moved to control the movement of the animal.

Figures 1, 2:
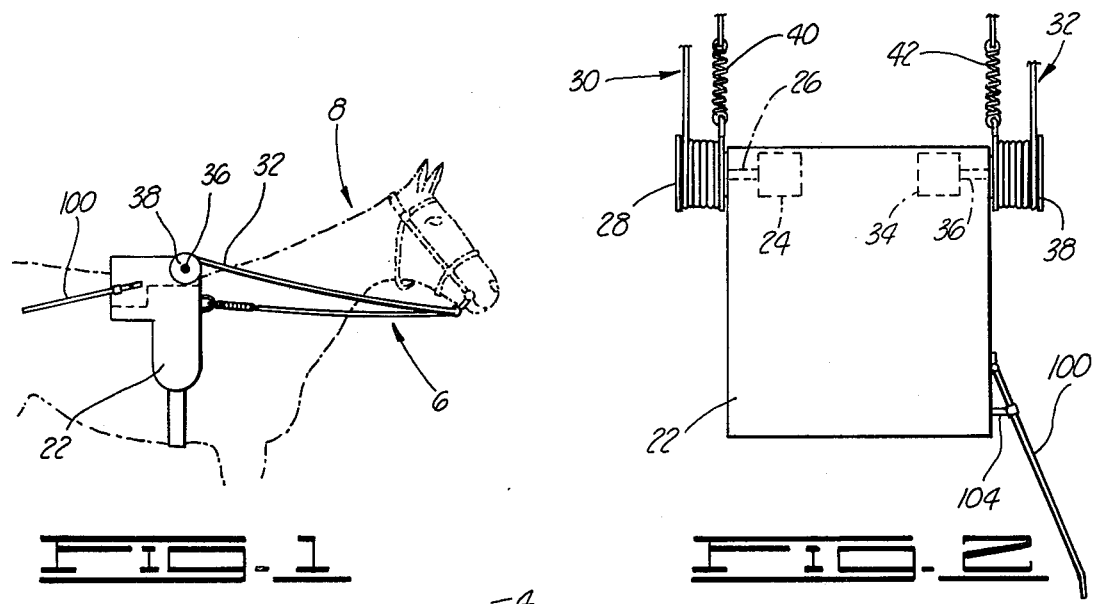
FIG. 1 is a schematic illustration showing a first preferred embodiment of a part of the present invention mounted on a horse.
FIG. 2 is a top plan view of the embodiment illustrated in FIG. 1.

Preferred embodiments of portions of the animal-handling means 4 are depicted in FIGS. 1, 2, 5 and 6. FIGS. 1 and 2 disclose that a first embodiment of the animal-handling means 4 includes a support member 22, such as a type of saddle, constructed for holding the other elements of the animal-handling means 4 as subsequently described. Mounted on the support member 22 are the rein receiver means 10 and the directional adjustment means 12.

The rein receiver means 10 of the animal-handling means 4 is of the type as is known in the art for receiving a transmitted signal, particularly an electromagnetic signal. The signal received by the rein receiver means 10 is appropriately conditioned and provided to the motor operating means 14 as illustrated in FIG. 3.

The directional adjustment means 12 of the animal-handling means is illustrated in FIGS. 1 and 2 and includes the first motor means 16 and the second motor means 18. The first motor means 16 includes a first motor 24 having a first drive shaft 26 with a first carrier means 28, such as a spool, connected thereto for winding or unwinding a first portion 30 of the reins 6 thereon in response to actuation of the first motor 24 by a first motor drive signal provided by the motor operating means 14. In the preferred embodiment depicted in FIGS. 1 and 2, the first motor drive shaft 26 extends substantially horizontally outwardly from the support member 22. The carrier means 28 is rotatably secured on the drive shaft 26 so that the portion 30 of the rein 6 can either be retracted or played out depending upon the direction of rotation of the first motor 24.

The animal-handling means 4 includes the second motor means 18 for manipulating a second portion 32 of the reins 6. The second motor means 18 includes a second motor 34 having a drive shaft with a second carrier means 38, such as a spool, mounted thereon for winding or unwinding the second portion 32 of the reins 6 in response to actuation of the second motor means 18 by a second motor drive signal provided by the motor operating means 14. As shown in FIG. 2, the drive shaft 36 of the second motor means 18 extends substantially horizontally away from the support member 22 toward a direction substantially opposite that direction toward which the first drive shaft 26 extends. This positioning of the second drive shaft 36 and the second carrier means 38 permits the second portion 32 of the reins 6 to be retracted or played out according to the direction of the movement of the second motor.

To permit the animal to move its head whenever the tension on the reins 6 is less than a predetermined value, the preferred embodiment depicted in FIGS. 1 and 2 includes means for allowing the animal to move its head when the tension on the reins is less than the predetermined value. The head movement allowing means particularly includes a first flexible member such as a spring 40 which connects a first end of the reins 6 to the support member 22 in the proximity of the second motor means 18. For the springs 40 and 42, the predetermined value of the tension can be defined as the tension beyond which the springs cannot be further stretched without breaking. The springs 40 and 42 provide the interfacing means 20 for coupling movement of either the first motor means or the second motor means to the head of the animal so that the head is moved to control the movement of the animal.

The preferred embodiment of the portion of animal-handling means 4 depicted in FIGS. 1 and 2 and described above is useful with animals which are to be controlled by the independent, substantially longitudinal movement of two separate reins or two portions of a single, continuous rein. For example, the FIG. 1 embodiment can be used with a race horse which is controlled by a substantially rearward or forward movement of either or both of the reins portions 30 and 32. A second embodiment of the present invention capable of being used with an animal such as a cattle horse, which requires reining movement against the neck thereof instead of separate, substantially longitudinal rein control, will be described with reference to FIG. 6.

The FIG. 6 embodiment of a portion of the animal-handling means includes a substantially semi-circular member 44 pivotally and slidingly mounted on the animal. In particular, the semi-circular member 44 can be appropriately connected to a suitable support member such as one similar to that shown in FIGS. 1 and 2. The semi-circular member 44 includes a threaded curvilinear edge 46 and a threaded opening 48 defined therein. Extending from opposite ends of the semi-circular member are respective portions of the reins 6.

The connection between the semi-circular member 44 and the reins 6 may be made through respective springs 50 and 52 to permit the animal to move its head whenever the maximum tensioning of the springs 50 and 52 is not equaled or exceeded by the pull of the animal-handling means 4 as effected by the movement of the member 44. More generally, the springs 50 and 52 constitute a first biasing means and a second biasing means for connecting respective portions of the reins to respective ends of the semi-circular member 44.

In the FIG. 6 embodiment the first motor means 6 includes a first motor 56 having a first threaded drive shaft 58 for engaging the threaded curvilinear edge 46 of the semi-circular member 44 so that the member 44 is pivoted when the first motor 56 rotates the first threaded drive shaft 58. It is apparent that as the drive shaft 58 of the first motor 56 rotates, the semi-circular member 44 rotates to either pull the head of the animal to the left or right or to press the reins against either the left or right side of the neck of the animal, depending upon the size of the semi-circular member 44.

The second motor means 18 of the FIG. 6 embodiment includes a second motor 66 having a second threaded drive shaft 62 for engaging the threaded opening 48 of the member 44 so that the member 44 is slid longitudinally with respect to the animal when the second motor 60 rotates the second threaded drive shaft 62. It is apparent from FIG. 6 that as the second motor 60 rotates, the semi-circular member 44 will either be drawn toward the second motor 60 or pushed away from the second motor 60 whereby the member 44 moves substantially longitudinally with respect to the animal. To achieve this movement while retaining threaded engagement between the first drive shaft 58 and the threaded curvilinear edge 46, the first drive shaft 58 can be constructed to either move longitudinally with the semi-circular member 44 or can comprise two portions which are flexibly coupled so that the outer threaded portion can bend relative to the inner portion whenever the semi-circular member 44 is moved by the second motor 60. Other suitable means can also be used to permit forward or rearward movement of the member 44 while maintaining engagement between the drive shaft 58 and the threaded edge 46. Likewise, the second motor 60 and the second drive shaft 62 are appropriately constructed or mounted to accommodate the rotational action imparted to the member 44 by the first motor 56.

It is to be noted that other appropriate embodiments of the directional adjustment means 12 of the animal-handling means 4 can be used. For example, as shown in FIG. 8 the adjustment means 12 can include a central post 64 having the reins 6 connected thereto for achieving a movement similar to the movement effected by the FIG. 6 embodiment.

The first and second motor means 16 and 18 of the directional adjustment means 12 are responsive to respective motor drive signals provided by the motor operating means 14 which is responsive to the control signal received by the rein receiver means 10 illustrated in FIG. 3 and which forms another part of the directional adjustment means 12. An embodiment of the motor operating means 14 is schematically shown in FIG. 5 to include a control signal detector and encoder means 66 for receiving the signal from the rein receiver means 10 and for converting it into respective signals for either actuating either or both of the first and second motors means 16 and 18 or for maintaining the motors in an off condition. For the exemplary circuit shown in FIG. 5, a three-digit binary signal is output from the control signal detector and encoder means 66 to a first motor control circuit 68 which is particularly illustrated in FIG. 5 and which forms another part of the motor operating means 14. A similar circuit comprises a second motor control circuit 70. The operation of the first motor control circuit 68 and the similar second motor control circuit 70 depicted in FIG. 5 is readily apparent to one having ordinary skill in the art and operates to drive the first motor 24 in either of two directions either to wind or unwind the portion 30 of the reins 6 on the carrier means 28 of the first embodiment illustrated in FIGS. 1 and 2 or to rotate the semi-circular member 44 of the FIG. 6 embodiment. The operation of the motor operating means 14 as depicted in FIG. 5 will be more fully described hereinbelow.

It is to be noted that the animal-handling means 4 may be powered by any suitable means. For example, electrical, hydraulic, or pneumatic means can be used. The particular embodiments shown in the drawings are electrically powered by a suitable power supply. For example, the motor control circuit 68 includes a battery 70.

Figure 4:
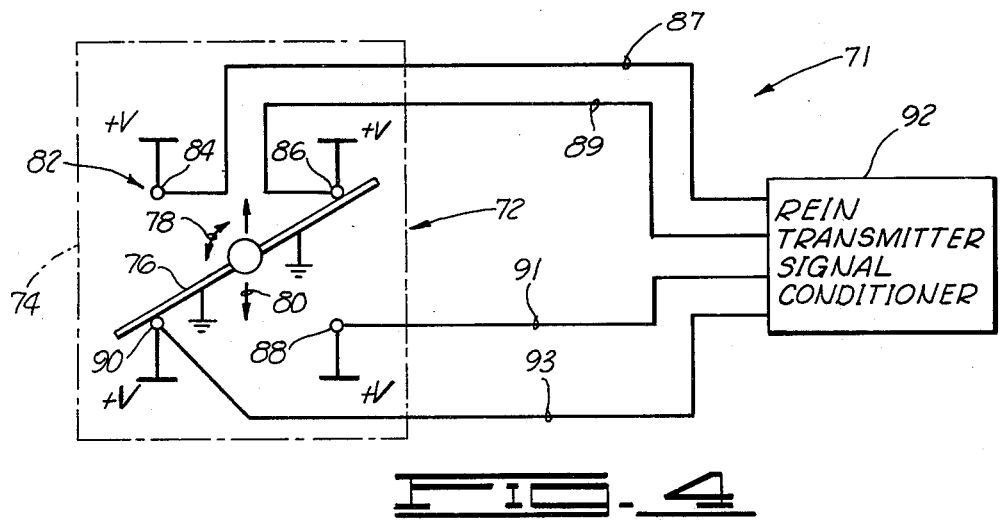
FIG. 4 is a schematic and block illustration of the transmitter means of the present invention.

In addition to the animal-handling means 4, the present invention includes the electronic transmitter means 2 of which a preferred embodiment is shown in FIG. 4. The transmitter means 2 includes rein transmitter means 71 comprising switch means 72 having a switch housing 74 and a switch element 76 rotatably and slidably mounted in the switch housing 74. The rotatable and slidable mounting of the switch element 76 is depicted in FIG. 4 by the arrows 78 and 80, respectively. The switch element 76 of the preferred embodiment is an electrically conductive element which can be connected to a ground potential as illustrated in FIG. 4. Other suitable types of switch elements can also be used.

The switch element 76 is appropriately moved to engage switch contact means 82. The switch contact means 82 particularly includes in the preferred embodiment switch contact poles 84, 86, 88 and 90 which are positioned in the switch housing 74 for electrically engaging the switch element 76 in predetermined relationships corresponding to predetermined rotational and sliding positions of the switch element 76 to provide a respective electrical signal for each of the predetermined relationships. For example, when the switch element 76 is positioned substantially horizontally as viewed in FIG. 4 and moved upward against switch contacts 84 and 86, a corresponding electrical signal comprising the particular ground or non-ground potentials applied to conductors 87, 89, 91 and 93 is provided. This electrical signal is communicated to rein transmitter signal conditioner means 92.

The rein signal transmitter signal conditioner means 92 includes an appropriate electrical circuit as is known in the art for encoding, such as by digital techniques, each respective electrical signal. For the embodiment shown in FIG. 4, the encoding is performed for each respective combination of ground and non-ground potentials provided on conductors 87, 89, 91 and 93.

For the preceding example wherein the switch element 76 is placed against the contacts 84 and 86, the rein transmitter signal conditioner means 92 generates an encoded signal designating that the first and second motors 24 and 34 of the FIG. 1 embodiment are to be rotated so that the respective portions of the reins 6 are played out from the respective carrier means 28 and 38 whereby the animal is allowed to proceed under its own head. Therefore, for the preferred embodiment the transmitter signal conditioning means 92 converts each electrical combination arising from the positioning of the switch element 76 adjacent the switch contact means 20 into the control signal which has a characteristic corresponding to the respective electrical signal and which is transmitted to the rein receiver means 10.

For the embodiment of the transmitter means 2 shown in FIG. 4, there are five combinations or positions of the switch element 76 with respect to the contacts 84, 86, 88 and 90; therefore, there are five signals which can be provided to the rein transmitter signal conditioner means 92. The five positions include those wherein the switch element 76 electrically contacts the posts 84 and 86, the posts 88 and 90, the posts 84 and 88, or the posts 86 and 90. A fifth position has the switch element 76 not electrically contacting any of the elements of the contact means 82. These five positions correspond to giving the animal free reining, stopping the animal, turning the animal to the right, turning the animal to the left and maintaining the reins in a fixed position. When any one of these five positions or signals is selected, a respective control signal having a respective format is generated and provided by the transmitter signal conditioner means 92 to the rein receiver means 10.

In addition to these five signals, a sixth signal can be provided by bat transmitter means 94 forming another part of the transmitter means 2 illustrated in FIG. 3. The bat transmitter means 94 includes appropriate circuitry as is known in the art, such as would include a button that can be depressed by the animal handler to generate a signal. Such a generated signal is transmitted to a bat receiver means 96 and onto a bat mechanism 98 such as is illustrated in FIG. 7.

The bat receiver means 96 and the bat mechanism 98 provide means for striking the animal in response to the generation by the bat transmitter means 94 of an appropriate control signal which will be designated as a second control signal to distinguish it from the first control signal transmitted by the rein transmitter 71 of the transmitter means 2. The bat mechanism 98 is shown in FIG. 7 to include a bat 100 movably mounted on the animal. Specifically, the bat 100 includes a crop-like element pivotally secured to the support member 22 of the FIG. 1 embodiment. An arm 104 of a solenoid 106 is connected to the crop-like support member 22. When the appropriate control signal from the bat transmitter means 94 is transmitted and received by the bat receiver means 96, the bat receiver means 96 actuates an appropriate switch means 110 to energize a coil element 112 of the solenoid 106. The energization of the coil 112 moves the arm 104 to draw the crop-like element of the bat 100 against the side of the animal. This action causes the animal to be urged forward. The electrical circuit 108 and solenoid 106 contained therein provide means which is responsive to the received second control signal transmitted by the bat transmitter means 94 for moving the bat 100 so that it strikes the animal.

The present invention can further include a speaker box (not shown) mounted on the support member 22 so that voice signals or commands can be transmitted by appropriate elements of the transmitter means 2 to the speaker box for verbally communicating with the animal.

With respect to the embodiments depicted in the drawings, the operation of the present invention will be described. By way of example, it will be assumed that the switch element 76 is as positioned in FIG. 4 to effect a leftward turning of the horse depicted in FIG. 1. With the switch element 76 in the position as shown in FIG. 4, the rein transmitter signal conditioner means 92 generates and transmits the appropriate control signal to the rein receiver means 10 mounted on the support member 22. The received control signal is detected and encoded by the control signal detector and encoder means 66 so that binary signals indicated by the digits shown in FIG. 5 are provided at the respective outputs 114.

With the low signal (designated by the numeral "0") placed on the control line which is shown as the rightmost output 114 of the means 66 and which extends to the first motor control circuit 68, a transistor 116 is switched on thereby energizing a relay coil 112 and closing associated relay switch elements 118 so that a field coil 120 of the first motor 24 is energized in a first direction thereby causing a first motor armature 122 and the drive shaft 26 connected thereto to rotate so that the lefthand portion 30 of the reins 6 is tensioned or wound onto the first carrier means 28.

Further, the high level signal on the control line which is shown as the leftmost of the outputs 114 and which extends to the second motor control circuit means 70 causes the second motor 34 to rotate the associated second carrier means 38 in a direction to release or play out the second portion 32 of the reins 6 wound thereon. In this manner, the head of the horse is pulled to the left and leftward movement of the horse is achieved.

It is to be noted that when all the control lines from the outputs 114 of the control signal detector and encoder means 66 are low logic levels for the embodiment shown in FIG. 5, transistors 124 and 126 are switched off thereby de-energizing the first relay coil 112 and a second relay coil 128 and actuating a brake element 132 which can be included to retain the respective motor drive shaft 26 in a selected position. This brake control and a similar one which can be used in the second motor control circuit 70 hold the carrier means 28 and 38 in selected positions when no signal is transmitted by the rein transmitter signal conditioner means 92. This occurs in the disclosed preferred embodiment when the switch element 76 does not contact any of the elements of the contact means 82.

Whenever the bat mechanism 98 is to be actuated, the animal handler actuates the bat transmitter means 94 such as by depressing a push button switch, which in turn actuates the solenoid 106 shown in FIG. 7 to move the bat 100 against the animal.

Thus, the present invention is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An apparatus for remotely controlling the movement of an animal, comprising:
    electronic transmitter means for generating and emitting a control signal; and
    animal-handling means, responsive to said control signal, for physically manipulating the animal, said animal-handling means inluding:
        receiver means for receiving said control signal; and
    directional adjustment means, responsive to said receiver means, for directing the movement of the animal.

2. An apparatus as defined in claim 1, wherein said electronic transmitter means includes:
    switch means, comprising:
        a switch housing;
        a switch element rotatably and slidably mounted in said switch housing; and
        switch contact means positioned in said switch housing for electrically engaging said switch element in predetermined relationships corresponding to predetermined rotational and sliding positions of said switch element to provide a respective electrical signal for each of said predetermined relationships; and
    transmitter signal conditioning means for converting each electrical signal into a respective control signal having a characteristic corresponding to the respective electrical signal.

3. An apparatus as defined in claim 2, wherein said directional adjustment means includes:
operating means for decoding the control signal received by said receiver means;
first motor means;
second motor means; and
interfacing means for coupling movement of either said first motor means or said second motor means to a head of the animal so that the head is moved to control the movement of the animal.

4. An apparatus as defined in claim 1, wherein said directional adjustment means includes:
operating means for decoding the control signal received by said receiver means;
first motor means;
second motor means; and
interfacing means for coupling movement of either said first motor means or said second motor means to a head of the animal so that the head is moved to control the movement of the animal.

5. An apparatus as defined in claim 1, wherein said apparatus further includes means for striking the animal to urge the animal forward.

6. An apparatus for remotely controlling reins connected to an animal, comprising:
electronic transmitter means for generating and emitting a first control signal; and
animal-handling means, responsive to said control signal, for manipulating the reins, said animal-handling means including:
receiver means, associated with the animal, for receiving said first control signal; and
rein adjusting means, for adjusting the tension on the reins.

7. An apparatus as defined in claim 6, wherein said rein adjusting means includes:
operating means, responsive to said received control signal, for providing a first motor drive signal and a second motor drive signal;
first motor means, responsive to the first motor drive signal, for manipulating the reins;
second motor means, responsive to the second motor drive signal, for manipulating the reins; and
means for allowing the animal to move its head when the tension on the reins is less than a predetermined value.

8. An apparatus as defined in claim 7, wherein:
said first motor means includes first carrier means for winding or unwinding a first portion of the reins thereon in response to actuation of said first motor means by the first motor drive signal; and
said second motor means includes second carrier means for winding or unwinding a second portion of the reins thereon in response to actuation of said second motor means by the second motor drive signal.

9. The apparatus as defined in claim 7, wherein:
said rein adjusting means further includes a semi-circular member pivotally and slidingly mounted on the animal, said member having a threaded curvilinear edge and a threaded opening defined therein;
said means for allowing the animal to move its head includes:
first biasing means for connecting a first portion of the reins to a first end of said semi-circular member; and
second biasing means for connecting a second portion of the reins to a second end of said semi-circular member;
said first motor means includes a first motor having a first threaded drive shaft for engaging said threaded edge of said member so that said member is pivoted when said first motor rotates said first threaded drive shaft; and
said second motor means includes a second motor having a second threaded drive shaft for engaging said threaded opening of said member so that said member is slid longitudinally with respect to the animal when said second motor rotates said second threaded drive shaft.

10. An apparatus as defined in claim 6, wherein said electronic transmitter means includes:
switch means, comprising:
a switch housing;
a switch element rotatably and slidably mounted in said switch housing; and
switch contact means positioned in said switch housing for electrically engaging said switch element in predetermined relationships corresponding to predetermined rotational and sliding positions of said switch element to provide a respective electrical signal for each of said predetermined relationships; and
transmitter signal conditioning means for converting each electrical signal into a respective control signal having a characteristic corresponding to the respective electrical signal.

11. An apparatus as defined in claim 10, wherein said rein adjusting means includes:
operating means, responsive to said received control signal, for providing a first motor drive signal and a second motor drive signal;
first motor means, responsive to the first motor drive signal, for manipulating the reins;
second motor means, responsive to the second motor drive signal, for manipulating the reins; and
means for allowing the animal to move its head when the tension on the reins is less than a predetermined value.

12. An apparatus as defined in claim 11, wherein:
said first motor means includes first carrier means for winding or unwinding a first portion of the reins thereon in response to actuation of said first motor drive signal; and
said second motor means includes second carrier means for winding or unwinding a second portion of the reins thereon in response to actuation of said second motor means by the second motor drive signal.

13. An apparatus as defined in claim 11, wherein:
said rein adjusting means further includes a semi-circular member pivotally and slidingly mounted on the animal, said member having a threaded curvilinear edge and a threaded opening defined therein;
said means for allowing the animal to move its head includes:
first biasing means for connecting a first portion of the reins to a first end of said semi-circular member; and
second biasing means for connecting a second portion of the reins to a second end of said semi-circular member;
said first motor means includes a first motor having a first threaded drive shaft for engaging said threaded edge of said member so that said member is pivoted when said first motor rotates said first threaded drive shaft; and said second motor means includes a second motor having a second threaded drive shaft for engaging said threaded opening of said member so that said member is slid longitudinally with respect to the animal when said second motor rotates said second threaded drive shaft.

14. An apparatus as defined in claim 6, wherein:

said transmitter means includes means for generating and emitting a second control signal;

said receiver means includes means for receiving the second control signal; and said apparatus further comprises:
   a bat movably mounted on the animal; and
   means, responsive to the received second control signal, for moving said bat so that said bat strikes the animal.

15. An apparatus as defined in claim 14, wherein said adjusting means includes:

operating means, responsive to said received control signal, for providing a first motor drive signal and a second motor drive signal;

first motor means, responsive to the first motor drive signal, for manipulating the reins;

second motor means, responsive to the second motor drive signal, for manipulating the reins; and means for allowing the animal to move its head when the tension on the reins is less than a predetermined value.

16. An apparatus as defined in claim 15, wherein:

said first motor means includes first carrier means for winding or unwinding a first portion of the reins thereon in response to actuation of said first motor means by the first motor drive signal; and said second motor means includes second carrier means for winding or unwinding a second portion of the reins thereon in response to actuation of said second motor means by the second motor drive signal.

17. An apparatus as defined in claim 15, wherein:

said rein adjusting means further includes a semi-circular member pivotally and slidingly mounted on the animal, said member having a threaded curvilinear edge and a threaded opening defined therein;

said means for allowing the animal to move its head includes:
   first biasing means for connecting a first portion of the reins to a first end of said semi-circular member;
   second biasing means for connecting a second portion of the reins to a second end of said semi-circular member;

said first motor means includes a first motor having a first threaded drive shaft for engaging said threaded edge of said member so that said member is pivoted when said first motor rotates said first threaded drive shaft; and said second motor means includes a second motor having a second threaded drive shaft for engaging said threaded opening of said member so that said member is slid longitudinally with respect to the animal when said second motor rotates said second threaded drive shaft.

18. An apparatus as defined in claim 14, wherein said electronic transmitter means includes:

switch means, comprising:
   a switch housing;
   a switch element rotatably and slidably mounted in said switch housing; and
   switch contact means positioned in said switch housing for electrically engaging said switch element in predetermined relationships corresponding to predetermined rotational and sliding positions of said switch element to provide a respective electrical signal for each of said predetermined relationships; and transmitter signal conditioning means for converting each electrical signal into a respective control signal having a characteristic corresponding to the respective electrical signal.

19. An apparatus as defined in claim 18, wherein said rein adjusting means includes:

operating means, responsive to said received control signal, for providing a first motor drive signal and a second motor drive signal;

first motor means, responsive to the first motor drive signal, for manipulating the reins;

second motor means, responsive to the second motor drive signal, for manipulating the reins; and means for allowing the animal to move its head when the tension on the reins is less than a predetermined value.

20. An apparatus as defined in claim 19, wherein:

said first motor means includes first carrier means for winding or unwinding a first portion of the reins thereon in response to actuation of said first motor means by the first motor drive signal; and said second motor means includes second carrier means for winding or unwinding a second portion of the reins thereon in response to actuation of said second motor means by the second motor drive signal.

21. An apparatus as defined in claim 19, wherein:

said rein adjusting means further includes a semi-circular member pivotally and slidingly mounted on the animal, said member having a threaded curvilinear edge and a threaded opening defined therein;

said means for allowing the animal to move its head includes:
   first biasing means for connecting a first portion of the reins to a first end of said semi-circular member; and
   second biasing means for connecting a second portion of the reins to a second end of said semi-circular member;

said first motor means includes a first motor having a first threaded drive shaft for engaging said threaded edge of said member so that said member is pivoted when said first motor rotates said first threaded drive shaft; and said second motor means includes a second motor having a second threaded drive shaft for engaging said threaded opening of said member so that said member is slid longitudinally with respect to the animal when said second motor rotates said second threaded drive shaft.

\* \* \* \* \*